(12) United States Patent
Deng et al.

(10) Patent No.: US 8,402,762 B2
(45) Date of Patent: Mar. 26, 2013

(54) POWER GENERATION PLANT AND METHOD OF GENERATING ELECTRIC ENERGY

(75) Inventors: Shimin Deng, Oakville (CA); Ruairi P. Hynes, Oakville (CA); William L. E. Davey, Mississauga (CA)

(73) Assignee: Hatch Ltd., Mississauga (CA)

( * ) Notice: Subject to any disclaimer, the term of this patent is extended or adjusted under 35 U.S.C. 154(b) by 368 days.

(21) Appl. No.: 12/824,397

(22) Filed: Jun. 28, 2010

(65) Prior Publication Data

US 2011/0146278 A1 Jun. 23, 2011

Related U.S. Application Data

(60) Provisional application No. 61/221,593, filed on Jun. 30, 2009.

(51) Int. Cl.
*F01K 7/34* (2006.01)

(52) U.S. Cl. ............................. 60/653; 60/39.182; 60/670

(58) Field of Classification Search ................... 60/653, 60/677, 678, 679, 39.182, 39.181, 645, 643, 60/670, 39.01, 39.5, 39.52
See application file for complete search history.

(56) References Cited

U.S. PATENT DOCUMENTS

| | | | |
|---|---|---|---|
| 5,078,752 A | 1/1992 | Mach et al. | |
| 5,132,007 A * | 7/1992 | Meyer et al. | 208/427 |
| 5,199,264 A | 4/1993 | Viscovich | |
| 5,671,601 A | 9/1997 | Bronicki et al. | |
| 6,212,873 B1 * | 4/2001 | Sugishita et al. | 60/39.182 |
| 7,096,659 B1 | 8/2006 | Hatamiya et al. | |
| 7,270,741 B2 | 9/2007 | Roelofse et al. | |

FOREIGN PATENT DOCUMENTS

WO WO2007052070 * 5/2007

OTHER PUBLICATIONS

WO 2007/052070 Wilson, The Process and Plant for Power Generation, May 10, 2007.*
International Search Report of PCT/CA2010/001037; Sep. 21, 2010; Julien Daigle.

* cited by examiner

*Primary Examiner* — Thomas Denion
*Assistant Examiner* — Kelsey Gambrel
(74) *Attorney, Agent, or Firm* — Bereskin & Parr LLP

(57) ABSTRACT

A power generation plant and a method of generating electric energy from recovered heat during an industrial process that uses steam as a means of transferring energy. The method comprises: a) generating a first saturated steam in a first heat exchanger heated by a first source of recovered heat; b) feeding the first saturated steam into a first steam turbine generator, where the first steam turbine generator outputs exhaust steam; c) removing moisture from the exhaust steam with a moisture separator; d) superheating the moisture reduced exhaust steam from step c) in a main heat exchanger with a heat source; and e) feeding the superheated exhaust steam into a second steam turbine generator. The power generation plant comprises a first source of saturated steam, a first steam turbine generator, a moisture separator, a second source of saturated steam, a heat exchanger and a second steam turbine generator.

16 Claims, 2 Drawing Sheets

POWER GENERATION PLANT AND METHOD OF GENERATING ELECTRIC ENERGY

RELATED APPLICATIONS

This application claims the benefit of 35 USC 119 based on the priority of U.S. Provisional Patent Application 61/221,593, filed Jun. 30, 2009, the entirety of the contents of which is incorporated herein by reference.

FIELD OF THE INVENTION

The present invention generally relates to the field of energy recovery in plants and processes such as those used for coal-to-liquid production.

BACKGROUND OF THE INVENTION

In its International Energy Outlook for 2008, the Energy Information Administration forecast that global energy consumption will grow by 50% between 2005 and 2030. Total global transportation fuel production is expected to reach 93 millions barrels of oil per day (MMbbl/d) by 2020. It is expected that coal-to-liquid (CTL) will become increasingly necessary to compensate for the increase in oil consumption. World production of unconventional resources (coal-to-liquid, gas-to-liquid, etc) totaled only 2.5 MMbbl/d in 2005, yet is expected to increase to at least 9.7 MMbbl/d by 2030, accounting for 9% of the total world liquid supply on an oil-equivalent basis.

Promising prospects are also predicted for other industrial gasification processes including turning vast world reserves of coal, oil sands, waste coal and petcoke into an array of higher value products such as electrical power, liquid fuels, SNG, fertilizers and other chemical feed stocks. High oil and gas prices make this a virtually irresistible option.

Because many of these industrial processes use large quantities of energy and are therefore costly, efforts are made to recover as much as possible of wasted energy, which is often in the form of heat. Hence, it is known to use power generation plants to recover waste energy during these industrial processes.

For example, processes with entrained flow gasifiers or other exothermal reactors are often characterized by the generation of large quantities of waste heat, which may be at least partly transferred to saturated steam at various pressures according to the location in the process. In a typical CTL plant using gasifiers and producing 40,000 bbl/d, a waste heat boiler and a Fischer-Tropsch (F-T) reactor, each produce approximately 1,000 tonne/h of saturated steam that can be used for power generation.

In a conventional power generation plant, each source of saturated steam is superheated in its own fired superheater before being fed to conventional steam turbines. The fuel used to fire the superheaters is usually a fuel gas purged from a synthesis loop of the industrial process. However, the fired superheaters are expensive pieces of equipment, their efficiency is poor, and they are sources of air polluting emissions.

Considering the quantity of waste energy involved in CTL and various other industrial processes, it is clear that improving the efficiency of the power generation process, or of one of its steps, can lead to significant additional energy recovery. Moreover, in view of ever increasing environmental considerations, improvements in the efficiency of the power generation process and plant are clearly advantageous.

SUMMARY OF THE INVENTION

It is an object of the present invention to provide a method of generating electric energy from waste heat during an industrial process that overcomes or mitigates one or more disadvantages of known methods, or at least provides a useful alternative.

It is another object of the present invention to provide a power generation plant for an industrial process plant producing saturated steam from wasted heat that overcomes or mitigates one or more disadvantages of known power generation plants for industrial process plants producing saturated steam from wasted heat.

The invention provides the advantages of providing a more efficient power generation plant that uses a more efficient method of generating electric energy that yields an industrial plant installation that can be cheaper than comparable known industrial plants. Moreover, the improved industrial plant recovers more wasted energy and has lower air emissions. Because the industrial plant is less expensive to manufacture and to build, and because wasted energy is recovered more efficiently during the industrial process, the industrial plant economics can be improved.

In accordance with one embodiment of the present invention, there is provided a method of generating electric energy from recovered heat during an industrial process such as a CTL process, that uses steam as a means of transferring energy. The method comprises the following steps: a) generating a first saturated steam in a first heat exchanger heated by a first source of recovered heat; b) feeding the first saturated steam into a first steam turbine generator, where the first steam turbine generator outputs exhaust steam; c) removing moisture from the exhaust steam with a moisture separator; d) superheating the moisture reduced exhaust steam from step c in a main heat exchanger with a heat source; and e) feeding the superheated exhaust steam into a second steam turbine generator.

In accordance with another embodiment of the present invention, there is provided a power generation plant for an industrial process plant such as a CTL plant, that produces saturated steam from recovered heat. The power generation plant comprises a first source of saturated steam, a first steam turbine generator, a moisture separator, a second source of saturated steam, a heat exchanger and a second steam turbine generator. The first steam turbine generator has a first inlet and a first outlet. The first inlet is connected to the first source of saturated steam. The moisture separator is connected to the first outlet of the first steam turbine generator. The moisture separator is adapted to remove moisture from an exhaust steam coming from the first outlet and thereby produce dried exhaust steam. The heat exchanger is connected to the moisture separator and to the second source of saturated steam. The heat exchanger is adapted to receive and superheat the dried exhaust steam with the saturated steam from the second source. The heat exchanger has a heat exchanger outlet to exhaust the superheated dried exhaust steam. The second steam turbine generator connects to the heat exchanger outlet so as to receive the superheated dried exhaust steam.

BRIEF DESCRIPTION OF DRAWINGS

These and other features of the present invention will become more apparent from the following description in which reference is made to the appended drawings wherein.

DETAILED DESCRIPTION OF THE INVENTION

Power generation plants are often used in industrial processes to recover waste energy and transform it into usable energy such as electricity. Typical known power generation plants are used to recover by-product heat from the industrial process by using the heat to transform water into steam for driving generators. These power generation plants typically use superheaters to heat saturated steam before using the steam to power steam turbines which in turn generate electricity. Superheaters are used to remove excess humidity in the superheated steam, which would otherwise be detrimental to the steam turbines by eroding the turbine's blades and by lowering its expansion efficiency. Purge gas by-produced by the industrial process is used to fire the superheaters and also in a combined cycle unit.

In the power generation plant of the present invention, the superheaters are replaced by a moisture separator and reheater. Moreover, purge gas is used solely in the combined cycle unit. By doing so, more energy can be produced from the same amount of purge gas since the combined cycle has a better efficiency than the Rankine cycle, of the superheaters used in typical known power generation plants.

Although the power generation plant and associated method of producing electric energy of the present invention could be used in different types of industrial plants, the present embodiment will be described with respect to a coal-to-liquid (CTL) gasification plant.

Figure 1:
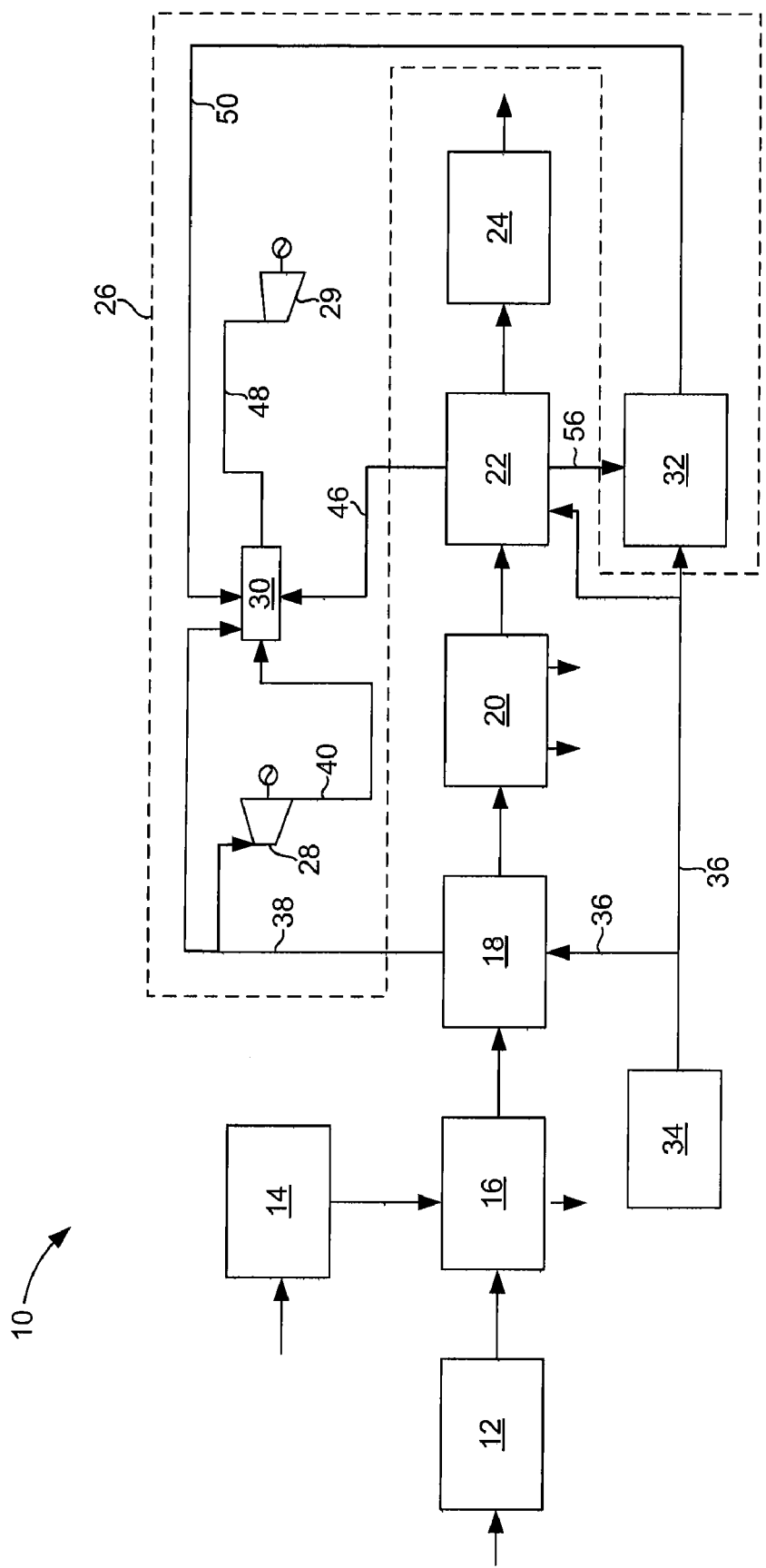
FIG. 1 is a schematic diagram of a coal-to-liquid plant in accordance with an embodiment of the present invention.
Figure 2:
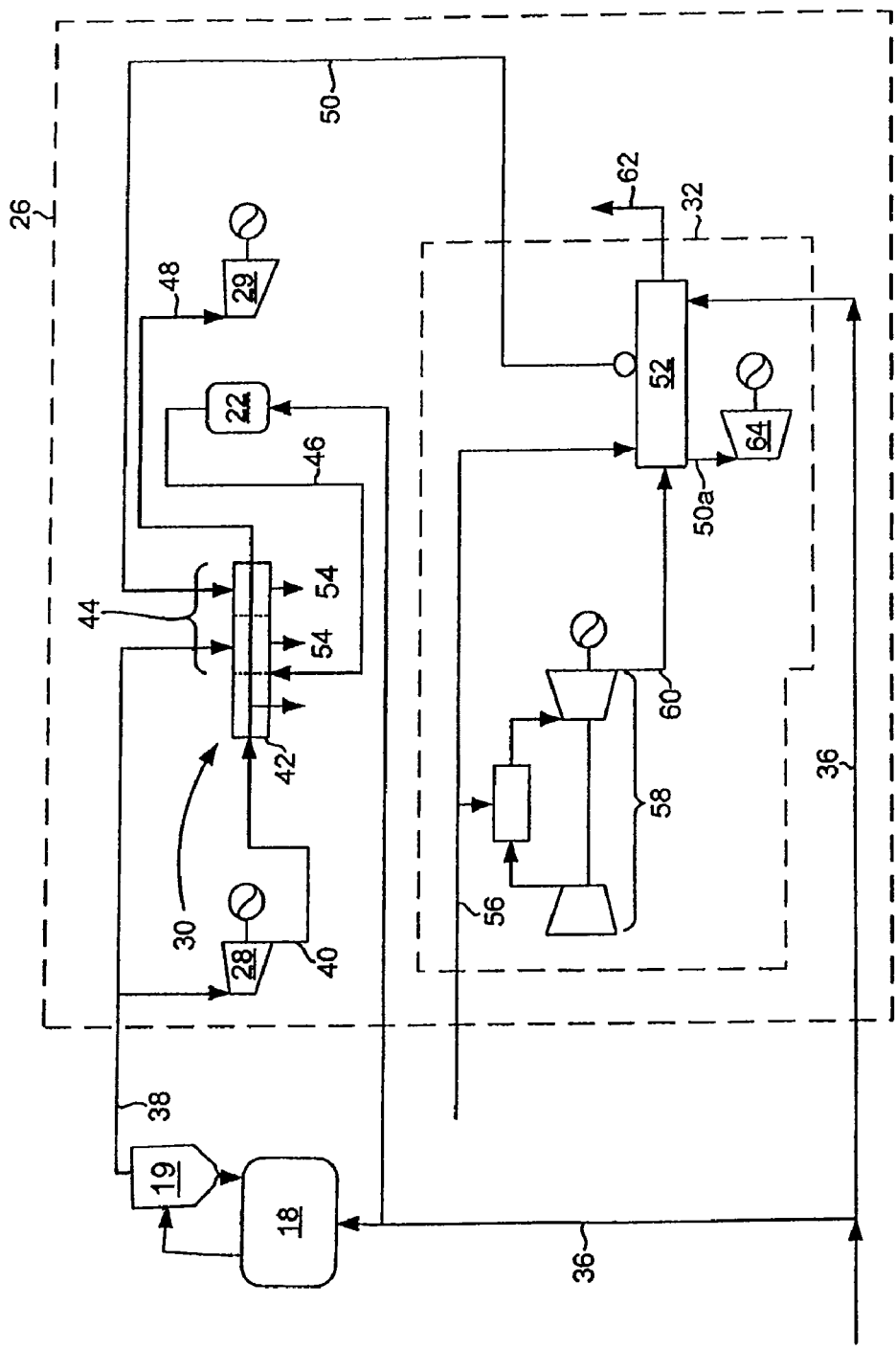
FIG. 2 is a schematic diagram of a detailed view of a power generation plant used in the coal-to-liquid plant of FIG. 1.

FIG. 1 depicts a diagram of a CTL plant 10 in accordance with an embodiment of the present invention. The CTL plant consists of the following plant areas: coal preparation 12 (drying, pulverizing and feeding), air separation unit (ASU) 14, gasification 16, waste heat boiler 18 for heat recuperation, syngas cleaning and purification 20, Fischer-Tropsch (F-T) gas-to-liquid synthesis reactor 22, refining 24, and power generation plant 26. FIG. 2 shows the details of the power generation plant 26.

In some examples, the power generation plant 26 is composed of a first steam turbine generator 28 and a second turbine generator 29, connected by a moisture separator and reheater (MSR) 30, and a combined cycle unit 32. A source of feed water 34, in which condensate from condensers is heated and de-aerated, supplies feed water 36. A first portion of the feed water 36 enters the waste heat boiler 18 and gets evaporated into waste heat boiler saturated steam 38. A first portion of the waste heat boiler saturated steam 38 enters the first steam turbine generator 28, which produces electricity from the energy contained in the pressurized waste heat boiler saturated steam 38.

Waste heat boiler saturated steam 38 can be at a pressure of 65 bars, a temperature of approximately 280° C. and at approximately 0% moisture. Optionally, a moisture separator 19 may be used to remove moisture from the waste heat boiler saturated steam 38. Waste heat boiler saturated steam 38 enters the first steam turbine generator 28, which is of a wet steam type, through its inlet and expands inside the turbine, thereby producing work. Waste heat boiler saturated steam 38 exits the first steam turbine generator in the form of exhaust steam 40. The exhaust steam 40 can be at a pressure of 18.5 bars, a temperature of approximately 208° C. and at approximately 12% moisture. The first steam turbine generator 28 may be equipped with its own moisture separator.

In turn, the exhaust steam 40 enters the MSR 30. Some examples of the MSR 30 are comprised of two portions: a first portion is a moisture separator 42 and a second portion is a heat exchanger 44. The moisture separator 42 may comprise baffles so that the exhaust steam has to travel around the baffles, which drains some of the humidity in the exhaust steam 40. The moisture separator 42 can reduce the moisture content of the exhaust steam 40 to approximately 5% at the moisture separator outlet.

Before the dried exhaust steam 40 enters the heat exchanger 44, saturated steam 46 from the F-T reactor 22 is mixed with the dried exhaust steam 40. This mixed exhaust steam 48 then enters the heat exchanger 44 to be reheated.

The heat exchanger 44 of the MSR 30 may receive saturated steam from multiple sources: for example a first source of saturated steam is the waste heat boiler 18. As mentioned, a portion of the waste heat boiler saturated steam 38 provided by the waste heat boiler powers the first steam turbine 28. A second portion of the waste heat boiler saturated steam 38 is directed to the heat exchanger 44 to reheat the mixed exhaust steam 48. The heat exchanger 44 may also receive saturated steam 50 from a heat recovery steam generator (HRSG) 52 within the MSR 30. The HRSG saturated steam 50 enters the heat exchanger 44 at a temperature of approximately 314° C. and a pressure of approximately 104 bars. Both the HRSG saturated steam 50 and the second portion of saturated steam 38 from the waste heat boiler reheat the mixed exhaust steam 48 to a superheated state at a temperature of approximately 304° C. and a pressure of approximately 17 bars.

The MSR 30 may have different stages. For example, a first stage may be the moisture separator 42, a second stage may be a first portion of the heat exchanger 44 where the second portion of the waste heat boiler saturated steam 38 reheats the mixed exhaust steam 48, while a third stage may be a second portion of the heat exchanger 44 where the HRSG saturated steam 50 further reheats the mixed exhaust steam 48. At any one or more, and optionally at all of the stages of the MSR 30, drain water 54 is collected. This drain water 54 comes either from moisture separated from the exhaust steam 40 or from condensed water from the second portion of waste heat boiler saturated steam 38 and the HRSG saturated steam 50 that entered the heat exchanger 44 to reheat the mixed exhaust steam 48. The drain water 54 can be recycled in the power plant 26.

The superheated mixed exhaust steam 48 then enters the second steam turbine generator 29 where it expands to produce further work. This allows the second steam turbine generator 29 to produce electricity.

The combined cycle unit 32 used in the power plant 26 has a similar disposition to that of known power plants, except that first, it receives more purge gas 56, which is a by-product of the industrial process used in the CTL plant 10 and secondly, as mentioned, a portion of the saturated steam 50 from the HRSG 52 is directed to the MSR 30.

Preferably all, or substantially all of the by-produced purge gas 56 is directed to the combined cycle unit 32. Inside the combined cycle unit 32, a first portion of the purge gas 56 is used to power a gas turbine generator 58, which produces electricity.

The gas turbine generator 58 produces hot exhaust gases 60. The heat of these hot exhaust gases 60 can also be recovered in the HRSG 52 and used to heat, evaporate and superheat a second portion of feed water 36 that enters the HRSG 52. The hot exhaust gases 60, having transferred a portion of their heat, can exit the HRSG 52 to the atmosphere as cooled flue gases 62.

A second portion of the purge gas 56 is fired in a duct burner within the HRSG 52 to transfer additional heat to the feed water 36 and produce superheated saturated steam 50.

Not all of the saturated steam 50a is directed to the MSR 30. A second portion of the saturated steam 50 is superheated and fed to a third steam turbine generator 64 where it expands and produces work, thereby allowing the third steam turbine generator 64 to generate electricity.

Advantageously, the power plant 26 of the present invention is more efficient, that is, it generates more electricity for a given amount of energy used than known power plants. This is because all purge gas by-produced by the industrial process is used in a combined cycle, rather than partly in a combined cycle and partly in a Rankine cycle as in known power plant processes. The efficiency of the combined cycle is approximately 50% while the efficiency of the Rankine cycle is only approximately 30%.

The power plant configuration of the present invention can be applied to single saturated steam source or to multiple saturated steam sources depending on the process. With different sources and parameters of saturated steam, different power generation configurations can be developed by using the moisture separation power cycle concept.

The power plant configuration of the present invention applies to various industrial processes, and especially gasification processes, where saturated steam is produced, such as CTL, ammonia, methanol, hydrogen, and SNG production.

The power plant configuration of the present invention may also be applied to industrial processes such as iron and steel-making, bauxite and alumina production, where common headers of steam with different pressure exist.

The CTL gasification process of the embodiment of the invention shown in FIGS. 1 and 2 and a conventional CTL gasification process were both simulated on computer using Aspen Plus™ and GTPro/GTMaster™ software applications for comparison as Case A and Case B. Key streams parameters for Case A and Case B are shown in Tables A and B, respectively. (The feed water system is simplified to reflect a mass balance of steam generation of a power plant.) A CTL gasification plant with capacity of 40,000 bbl/d is simulated, in which dry-fed entrained flow gasifiers and cobalt catalyst F-T synthesis reactors are used.

Case A: Conventional Power Generation

According to the total quantity of purge gas available, which is the same for both Case A and Case B, a GE 7EA gas turbine is selected for Case A. This gas turbine operates at 94% load due to the limitation from low Btu gas application. There is no supplementary firing in the HRSG. A condensing steam turbine with steam induction from a HRSG is used.

TABLE A

Computer Simulated Stream Parameters for Conventional Power Generation

| | Stream Name | Pressure bar | Temperature ° C. | Flow Rate tonne/h |
|---|---|---|---|---|
| Known CTL Plant | Feed Water | | | 2,285 |
| | Feed Water to Waste Heat Boiler | | | 1,108 |
| | Steam from Waste Heat Boiler | 35.0 | 242.6 | 1,086 |
| | Fuel Gas to Fired Superheater (1) | 3.0 | 34.0 | 29 |
| | Steam Turbine (1) Inlet Steam | 32.2 | 420.0 | 1,086 |
| | Feed Water to F-T Reactor | | | 1,018 |
| | Steam from F-T Reactor | 18.0 | 207.2 | 997 |
| | Fuel Gas to Fired Superheater (2) | 3.0 | 34.0 | 20 |
| | Steam Turbine (2) Inlet Steam | 16.6 | 350.0 | 997 |
| | Fuel Gas to Gas Turbine | 3.0 | 34.0 | 51 |
| | Gas Turbine Exhaust | 1.02 | 531.3 | 1,121 |
| | Flue Gas to Stack | 1.00 | 113.1 | 1,121 |
| | Steam Turbine (3) Inlet Steam | 69.0 | 510.0 | 129 |
| | Feed Water to HRSG | | | 160 |

For the conventional known power generation plant configuration, the results indicate:

Total heat input, HHV: 571.4 MWth

Total Power output: 643.6 MWe

It is noted that the heat for producing saturated steam in the waste heat boiler of gasification island and in the F-T reactor is not included in the total heat input.

Case B: Power Generation in Accordance with the Present Invention

The same 40,000 bbl/d CTL gasification plant is simulated based on a configuration for power generation in accordance with the present invention. Because the method of the present invention provides more purge gas to the gas turbine than with the known method, a GE 7FA gas turbine is selected. This gas turbine also operates at 94% load. In order to handle the total quantity of purge gas, a small portion of it is used as supplementary firing in the HRSG.

TABLE B

Computer Simulated Stream Parameters for Power Generation in Accordance with the Present Invention

| | Stream No. in FIGS. 1 & 2 | Stream Name | Pressure bar | Temperature ° C. | Flow Rate tonne/h |
|---|---|---|---|---|---|
| CTL Plant using Power Generation of the Present Invention | 36 | Feed Water | | | 2,451 |
| | | Feed Water to Waste Heat Boiler | | | 1,124 |
| | 38 | Steam from Waste Heat Boiler | 70.0 | 285.9 | 1,101 |
| | | Steam Turbine (1) Inlet Steam | 65.0 | 280.9 | 802 |
| | 40 | Steam Turbine (1) Exhaust Steam | 18.5 | 208.4 | 802 |
| | | Steam to Stage-1 Reheater | 65.0 | 280.9 | 299 |
| | | Steam to Stage-2 Reheater | 104.0 | 313.9 | 29 |
| | | Drain from Moisture Separator | 18.0 | 207.2 | 58 |
| | | Drain from Stage-1 Reheater | 65.0 | 280.9 | 299 |
| | | Drain from Stage-2 Reheater | 104.0 | 313.9 | 29 |
| | | Feed Water to F-T Reactor | | | 1,018 |

TABLE B-continued

Computer Simulated Stream Parameters for Power Generation in Accordance with the Present Invention

| Stream No. in FIGS. 1 & 2 | Stream Name | Pressure bar | Temperature ° C. | Flow Rate tonne/h |
|---|---|---|---|---|
| 46 | Steam from F-T Reactor | 18.0 | 207.2 | 997 |
| 48 | Steam Turbine (2) Inlet Steam | 16.6 | 303.9 | 1,741 |
| 56 | Fuel Gas to Gas Turbine | 3.0 | 34.0 | 99 |
| 60 | Gas Turbine Exhaust | 1.03 | 604.1 | 1,672 |
| 62 | Flue Gas to Stack | 1.00 | 82.9 | 1,679 |
|  | Steam Turbine (3) Inlet Steam | 101.9 | 549.1 | 224 |
|  | Feed Water to HRSG |  |  | 310 |

For the power generation plant of the present invention, the results show:

Total heat input, HHV: 571.4 MWth
Total Power output: 693.8 MWe

By comparing the results of Case A and Case B, it can be seen that, for the same quantity of heat and of purge gas provided by the industrial process, the output of the power generation plant of the present invention is 50.2 MWe, or 7.8%, greater.

The increase of power by 50.2 MW benefits not only from the shift of fuel gas utilization from the Rankine cycle to the combined cycle, which accounts for 35.0 MW, but also from using a more advanced gas turbine (7FA vs. 7EA), which accounts for 15.2 MW.

The annual economic benefit of this additional power generation can reach 28 M$ when an operational availability factor of 92% and electricity rate of 0.07 $/kWh are selected. Moreover, by removing two fired superheaters used in the known power generation plant, the capital cost of the CTL gasification plant may be reduced. Also, it is noted that the specific emissions of green house gases (GHG) per giga joule (GJ) of energy produced may also be reduced. By using a power generation plant configuration in accordance with the present invention, the overall economics of a CTL plant or other industrial plant, can be improved.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

We claim:

1. A method of generating electric energy from recovered heat during an industrial process that uses steam as a means of transferring energy comprising the following steps:
   a) generating a first saturated steam in a first heat exchanger heated by a first source of recovered heat;
   b) feeding said first saturated steam into a first steam turbine generator, said first steam turbine generator outputting a first exhaust steam;
   c) removing moisture from said first exhaust steam with a moisture separator, the moisture separator outputting a dried exhaust steam;
   d) superheating said dried exhaust steam from step c in a reheater heat exchanger with a reheater heat source, said reheater heat exchanger outputting a superheated exhaust steam;
   e) feeding said superheated exhaust steam into a second steam turbine generator;
   f) generating a second saturated steam in a second heat exchanger heated by a second source of recovered heat and wherein said reheater heat source comprises said second saturated steam; and
   g) generating a third saturated steam in a third heat exchanger heated by a third source of recovered heat and mixing said third saturated steam with said dried exhaust steam thereby producing a mixed exhaust steam, said superheating comprising superheating said mixed exhaust steam and said feeding comprising feeding said superheated mixed exhaust steam into said second steam turbine generator.

2. The method of claim 1 wherein said reheater heat source comprises a portion of said first saturated steam.

3. The method of claim 1 wherein said first heat exchanger is part of a waste heat boiler, said second heat exchanger is part of a combined cycle unit and said third heat exchanger is part of a Fischer-Tropsch reactor.

4. The method of claim 1 wherein said moisture separator and said reheater heat exchanger are combined as a moisture separator and reheater, said moisture removing occurring in a first stage of said moisture separator and reheater, said mixing occurring at a second stage of said moisture separator and reheater and said superheating occurring at a third stage of said moisture separator and reheater.

5. The method of claim 1 further comprising recycling drained water from at least one of said first, second and third saturated steams and said exhaust steam.

6. The method of claim 1 further comprising feeding a by-produced purge gas from the industrial process solely to a combined cycle unit.

7. The method of claim 6 wherein said feeding said purge gas comprises feeding a first portion of said purge gas to a gas turbine generator of said combined cycle unit.

8. The method of claim 7 further comprising heating said second saturated steam with a second portion of said purge gas.

9. The method of claim 1 further comprising removing moisture from said first saturated steam before said feeding to said first steam turbine generator.

10. The use of the process of claim 1 in a gasification industrial process wherein heat from the gasification industrial process comprises the first source of recovered heat.

11. The use of the process of claim 10 in a coal gasification industrial process wherein heat from the coal gasification industrial process comprises the first source of recovered heat.

12. A power generation plant for an industrial process plant producing saturated steam from recovered heat, the power generation plant comprising:
- a first source of saturated steam;
- a first steam turbine generator, said first steam turbine generator having a first inlet and a first outlet, said first inlet being connected to said first source of saturated steam;
- a moisture separator connected to said first outlet of said first steam turbine generator, said moisture separator being adapted to remove moisture from an exhaust steam coming from said first outlet and thereby produce dried exhaust steam;
- a second source of saturated steam;
- a heat exchanger connected to said moisture separator and to said second source of saturated steam, said heat exchanger being adapted to receive and superheat said dried exhaust steam with said saturated steam from said second source, said heat exchanger having a heat exchanger outlet to exhaust said superheated dried exhaust steam;
- a second steam turbine generator connected to said heat exchanger outlet so as to receive said superheated dried exhaust steam; and
- a third source of saturated steam, said third source of saturated steam being connected between said moisture separator and said heat exchanger to introduce said saturated steam from said third source into said dried exhaust steam so as to produce a mixed steam, said heat exchanger being adapted to receive and to superheat said mixed steam, said second turbine generator being adapted to receive said superheated mixed steam.

13. The power generation plant of claim 12 wherein said third source is a Fischer-Tropsch reactor.

14. The power generation plant of claim 12 further comprising a combined cycle unit having a gas turbine generator and a source of by-produced purge gas, said purge gas source being solely connected to said combined cycle unit, said purge gas source being connected to said gas turbine generator within said combined cycle unit.

15. The power generation plant of claim 14 wherein said source of by-produced purge gas is connected to a heater within said combined cycle unit, said heater being adapted to heat said saturated steam from said second source.

16. The power generation plant of claim 15 wherein said second source is said combined cycle unit.

* * * * *